US010957064B2

(12) United States Patent
Ganguli et al.

(10) Patent No.: US 10,957,064 B2
(45) Date of Patent: Mar. 23, 2021

(54) METHOD AND SYSTEM FOR MULTIPLE STEREO BASED DEPTH ESTIMATION AND COLLISION WARNING/AVOIDANCE UTILIZING THE SAME

(71) Applicant: PLUSAI CORP, Cupertino, CA (US)

(72) Inventors: Anurag Ganguli, Milpitas, CA (US); Timothy Patrick Daly, Jr., San Jose, CA (US); Hao Zheng, Saratoga, CA (US); David Wanqian Liu, Los Altos, CA (US)

(73) Assignee: PLUSAI CORP, Cupertino, CA (US)

( * ) Notice: Subject to any disclaimer, the term of this patent is extended or adjusted under 35 U.S.C. 154(b) by 135 days.

(21) Appl. No.: 16/232,914

(22) Filed: Dec. 26, 2018

(65) Prior Publication Data

US 2019/0206075 A1 Jul. 4, 2019

Related U.S. Application Data

(60) Provisional application No. 62/612,196, filed on Dec. 29, 2017.

(51) Int. Cl.
| | |
|---|---|
| *G06T 7/593* | (2017.01) |
| *H04N 13/243* | (2018.01) |
| *H04N 13/25* | (2018.01) |
| *G06K 9/00* | (2006.01) |
| *B60Q 9/00* | (2006.01) |
| *H04N 13/293* | (2018.01) |
| *H04N 13/00* | (2018.01) |

(52) U.S. Cl.
CPC ............ *G06T 7/596* (2017.01); *B60Q 9/008* (2013.01); *G06K 9/00791* (2013.01); *G06K 9/00805* (2013.01); *H04N 13/243* (2018.05); *H04N 13/25* (2018.05); *H04N 13/293* (2018.05); *G06T 2207/20221* (2013.01); *G06T 2207/30252* (2013.01); *H04N 2013/0081* (2013.01)

(58) Field of Classification Search
CPC ........................................................ G06T 7/596
USPC ........................................................... 348/47
See application file for complete search history.

(56) References Cited

U.S. PATENT DOCUMENTS 10,455,212 B1 * 10/2019 Konolige ............. H04N 13/122
2007/0092245 A1 4/2007 Bazakos et al.
(Continued)

OTHER PUBLICATIONS

International Search Report and Written Opinion dated Mar. 8, 2019 in International Application PCT/US2018/067546.
(Continued)

*Primary Examiner* — Yulin Sun
(74) *Attorney, Agent, or Firm* — Pillsbury Winthrop Shaw Pittman LLP

(57) ABSTRACT

The present teaching relates to method, system, medium, and implementation of determining depth information in autonomous driving. Stereo images are first obtained from multiple stereo pairs selected from at least two stereo pairs. The at least two stereo pairs have stereo cameras installed with the same baseline and in the same vertical plane. Left images from the multiple stereo pairs are fused to generate a fused left image and right images from the multiple stereo pairs are fused to generate a fused right image. Disparity is then estimated based on the fused left and right images and depth information can be computed based on the stereo images and the disparity.

13 Claims, 15 Drawing Sheets

(56) References Cited

U.S. PATENT DOCUMENTS

| | | | |
|---|---|---|---|
| 2008/0304705 A1 | 12/2008 | Pomerleau et al. | |
| 2012/0268599 A1 | 10/2012 | Schmidt et al. | |
| 2014/0049536 A1* | 2/2014 | Neuman .............. | H04N 13/239 |
| | | | 345/419 |
| 2014/0225990 A1 | 8/2014 | Einecke et al. | |
| 2015/0042491 A1* | 2/2015 | Burnison ................ | B60Q 1/52 |
| | | | 340/902 |
| 2017/0358099 A1 | 12/2017 | Harris et al. | |

OTHER PUBLICATIONS

International Preliminary Report on Patentability dated Jul. 9, 2020 in International Application PCT/US2018/067546.

* cited by examiner

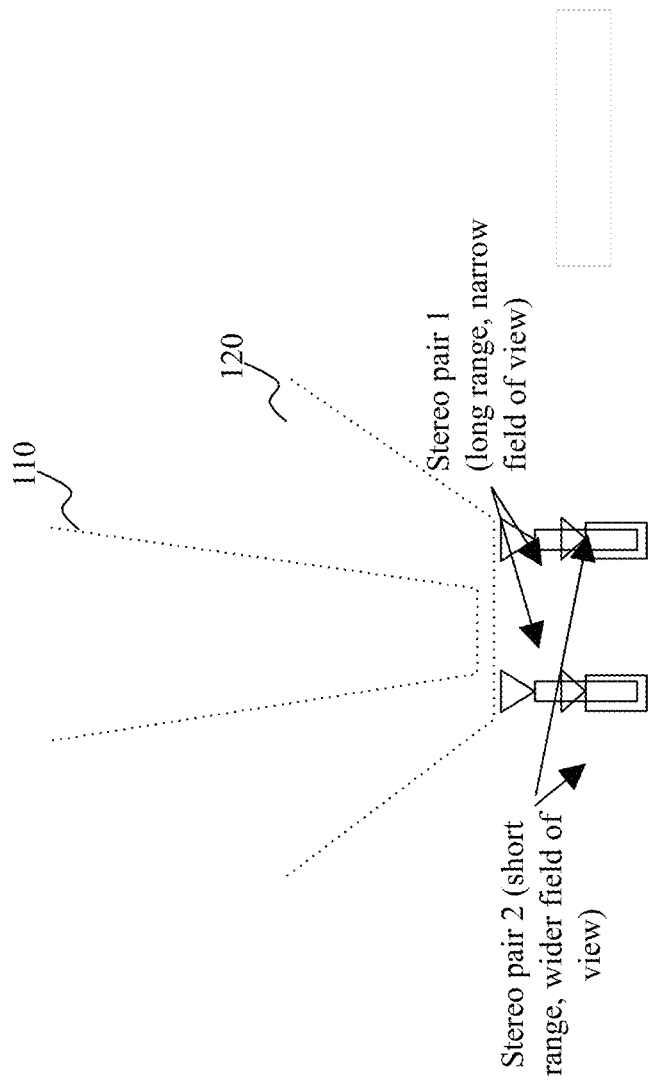

A Fused image 230 (with higher resolution image over a selected region)

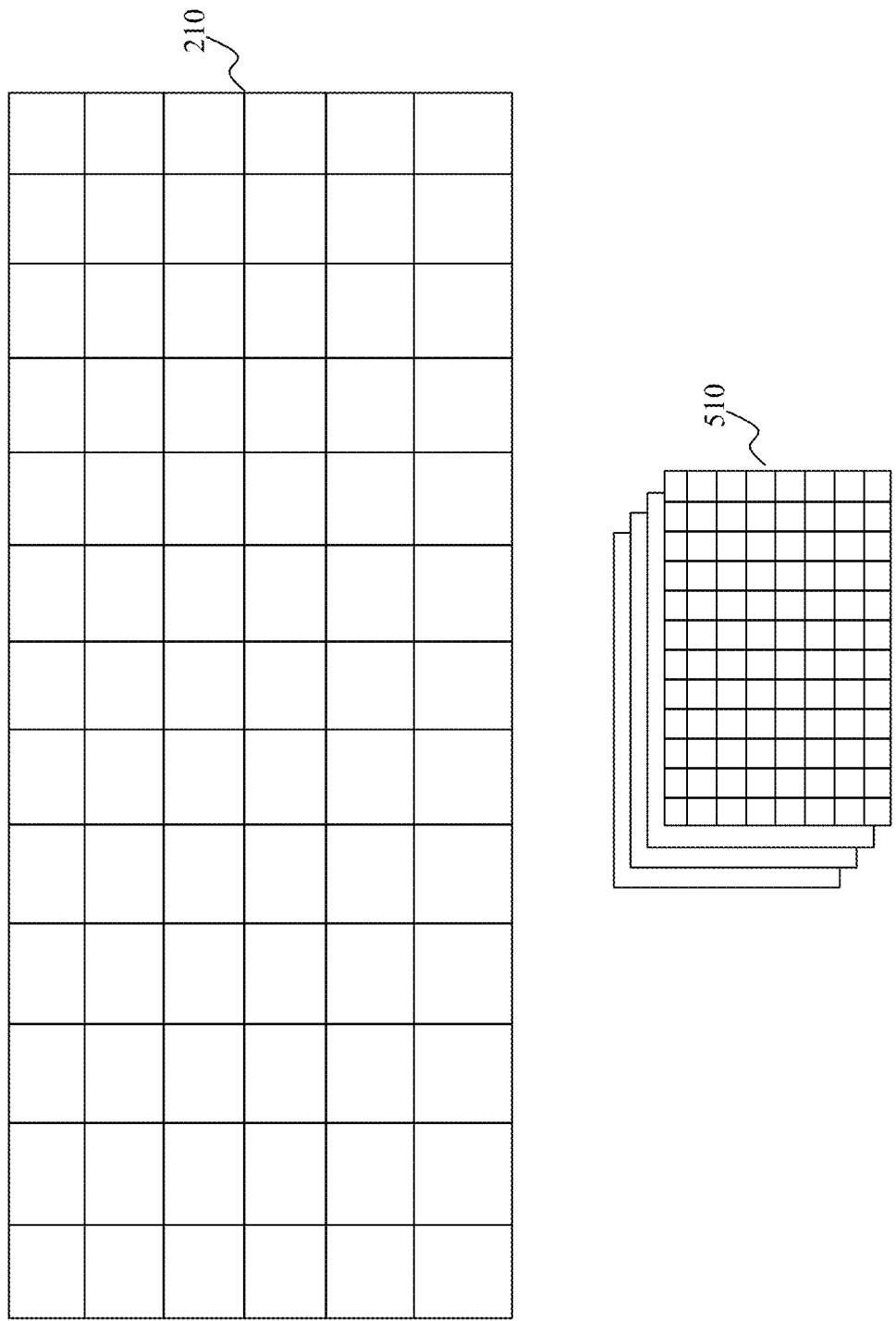

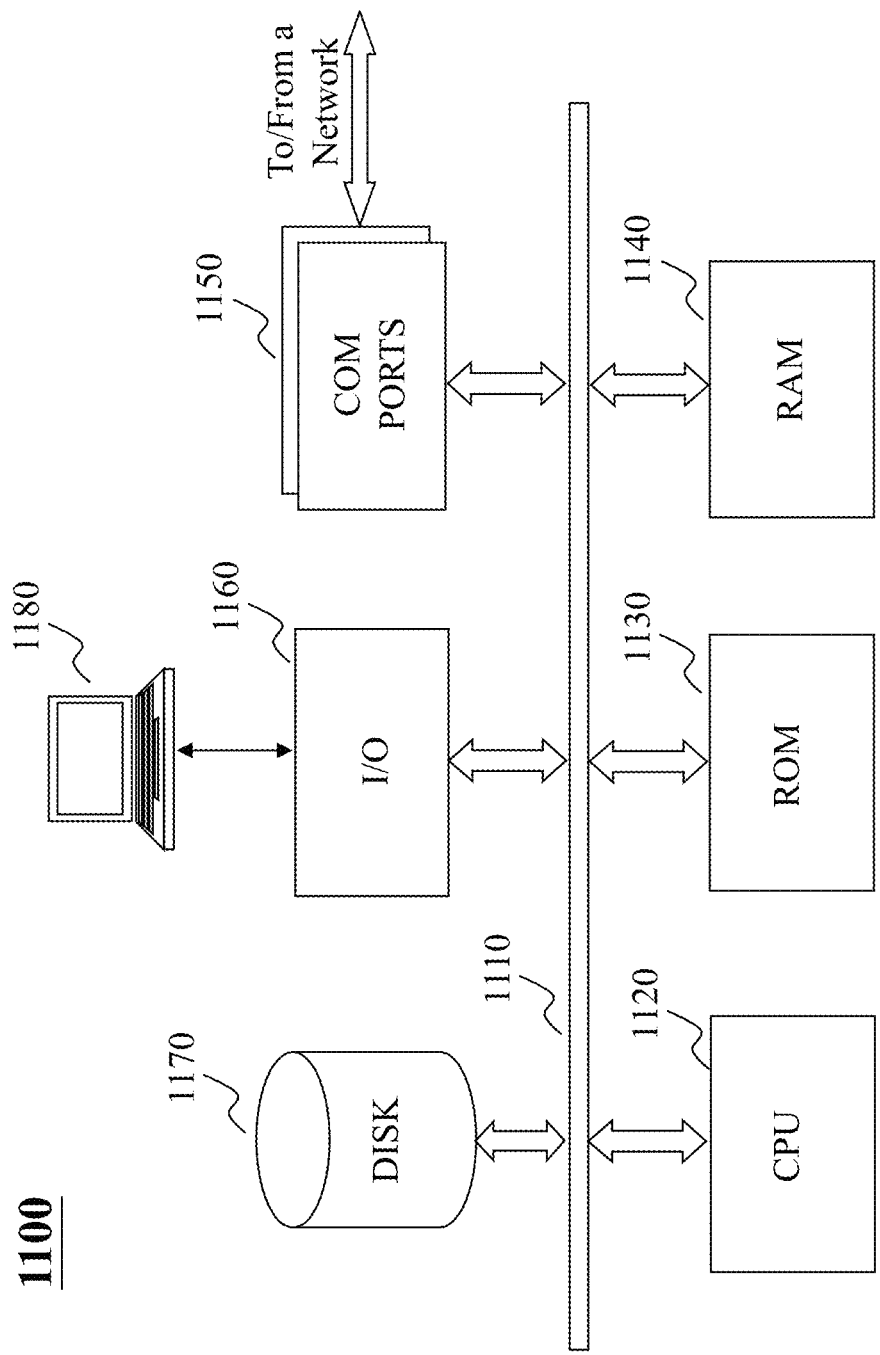

METHOD AND SYSTEM FOR MULTIPLE STEREO BASED DEPTH ESTIMATION AND COLLISION WARNING/AVOIDANCE UTILIZING THE SAME

CROSS-REFERENCE TO RELATED APPLICATIONS

This application claims priority to U.S. provisional application No. 62/612,196, filed Dec. 29, 2017, the contents of which are incorporated herein by reference in its entirety.

BACKGROUND

1. Technical Field

The present teaching generally relates to computer aided perception. More specifically, the present teaching relates to estimating depth based on images.

2. Technical Background

With recent technological advancement in artificial intelligence (AI), there is a surge in applying AI in different application fields. This includes the field of autonomous driving, in which identifying objects and/or obstacles around a vehicle is essential to achieve obstacle avoidance and ensure safety. Traditionally, sensors are installed around a vehicle to continuously collect surrounding data. Such collected data are then analyzed in real-time to detect surrounding objects/obstacles. Particularly important is to be aware of any obstacle that is also moving. For example, measurements of any moving vehicle that is nearby the ego vehicle, especially those that are moving towards the ego vehicle on a course of collision need to be made on-the-fly.

To effectively control obstacle avoidance, the distance between the ego vehicle and a surrounding object/obstacle is an important feature to estimate. This involves estimation of the depth of the surrounding. To facilitate prompt obstacle avoidance, depth estimation also needs to be performed on-the-fly. Traditionally, depth estimation relies on information in a pair of stereo images from multiple sensors. For example, stereo cameras may be deployed on the ego vehicle to acquire left and right images with a certain calibrated disparity and used to capture the surrounding scenes in different perspectives. Based on such stereo images of the same scene, depth map of the scene may be constructed and used in determining the distances between the objects in the scene and the ego vehicle. As it is known in the field, constructing a depth map from stereo images can be computationally intensive, making it more difficult to estimate depth information accurately on-the-fly. Although a coarser resolution images may be deployed to speed up the process, it sacrifices resolution that is often needed for obstacle avoidance.

Therefore, there is a need to provide an improved solution for estimating the depth information in autonomous driving.

SUMMARY

The teachings disclosed herein relate to methods, systems, and programming for online services. More particularly, the present teaching relates to methods, systems, and programming for developing a virtual agent that can have a dialog with a user.

In one example, a method for determining depth information in autonomous driving is disclosed. Stereo images are first obtained from multiple stereo pairs selected from at least two stereo pairs. The at least two stereo pairs have stereo cameras installed with the same baseline and in the same vertical plane. Left images from the multiple stereo pairs are fused to generate a fused left image and right images from the multiple stereo pairs are fused to generate a fused right image. Disparity is then estimated based on the fused left and right images and depth information can be computed based on the stereo images and the disparity.

In another example, a system for estimating depth information in autonomous driving is disclosed. The system includes multiple stereo pairs, a left image fusion unit, a right image fusion unit, a stereo based disparity estimator, and a multi-stereo based depth estimator. The multiple stereo pairs are selected from at least two stereo pairs, which have stereo cameras installed with the same baseline and in the same vertical plane. The left image fusion unit is configured for fusing left images from the multiple stereo pairs to generate a fused left image and the right image fusion unit is configured for fusing right images from the multiple stereo pairs to generate a fused right image. The stereo based disparity estimator is configured estimating disparity based on the fused left and right images. The multi-stereo based depth estimator is configured for computing depth information of a scene captured by the stereo images based on the stereo images and the disparity.

Other concepts relate to software for implementing the present teaching on developing a virtual agent. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, machine readable non-transitory medium is disclosed, wherein the medium has information for determining depth information in autonomous driving recorded thereon so that the information, when read by the machine, causes the machine to perform various steps. Stereo images are first obtained from multiple stereo pairs selected from at least two stereo pairs. The at least two stereo pairs have stereo cameras installed with the same baseline and in the same vertical plane. Left images from the multiple stereo pairs are fused to generate a fused left image and right images from the multiple stereo pairs are fused to generate a fused right image. Disparity is then estimated based on the fused left and right images and depth information can be computed based on the stereo images and the disparity.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 1A-1B depict top and front views of a configuration of multiple stereo image acquisition cameras, according to an embodiment of the present teaching;

FIGS. 5A-5B show a multiple stereo based depth estimation scheme, according to a different embodiment of the present teaching;

FIG. 11 depicts the architecture of a computer which can be used to implement a specialized system incorporating the present teaching.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to estimating depth based on stereo images for the purpose of obstacle avoidance in the context of autonomous driving. In various embodiments, the present teaching discloses an efficient system, method, and medium for on-the-fly estimation of depth of different parts of a scene to enable automatic obstacle avoidance.

In autonomous driving, a crucial task is collision warning and avoidance. To achieve that, an essential task is to be able to accurately estimate the depth or distance of any object in an appropriate direction of an ego vehicle. Traditionally, to estimate such a distance, a single stereo pair is used, which either has a narrow field of view which enables accurate estimation of distances to objects when the distance is larger between objects or has a wider field of view which enables accurate estimation of distances to objects when the objects are within a short range. To effectively detect a possible collision and/or generate a warning to avoid it, an accurate depth estimate for both short and long distances is needed.

Figure 1B:
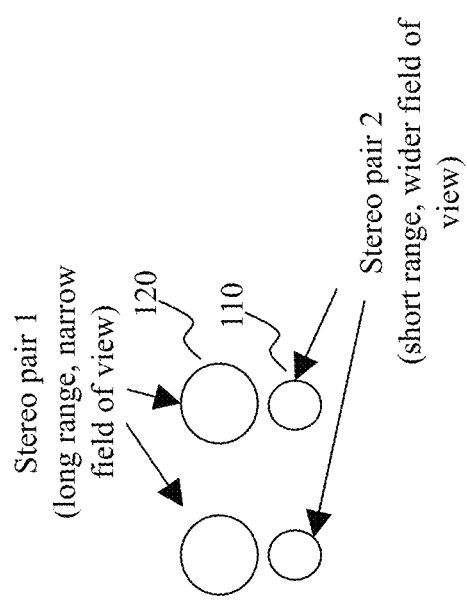

This present teaching discloses a dual or multiple stereo arrangement to achieve accurate estimate of distances for both short and long distances. FIGS. 1A-1B depict top and front views of a configuration of multiple stereo image acquisition cameras, according to an embodiment of the present teaching. In a top view of the multiple stereo camera configuration in FIG. 1A, cameras in a first stereo pair have a narrow field of view with long focal lengths, as shown via 110. This first pair enables accurate estimation of distances to objects at a far range. The cameras in a second stereo pair have a wider field of view with shorter focal lengths, as shown via 120. This second pair enables accurate estimation of distances to objects at a shorter range. The exemplary dual stereo pair arrangement in FIG. 1A can be extended to longer focal lengths. In FIG. 1B, a front view of the multiple stereo camera configuration is shown.

In some embodiments, the two stereo pairs as shown in FIGS. 1A-1B have identical baselines and are arranged in such a way that the left cameras of the two pairs are located in the same vertical plane. In the same way, the right cameras of the two pairs are located in the same vertical plane. In this manner, both pairs have identical baselines. Such an arrangement enables accurate combination of the information from the two stereo pairs. For example, images from the first stereo pair and the second stereo pair can be fused to achieve improved combined resolution which may enable enhanced performance in depth estimation. This is illustrated in FIGS. 2A-2C.

Figure 2A:
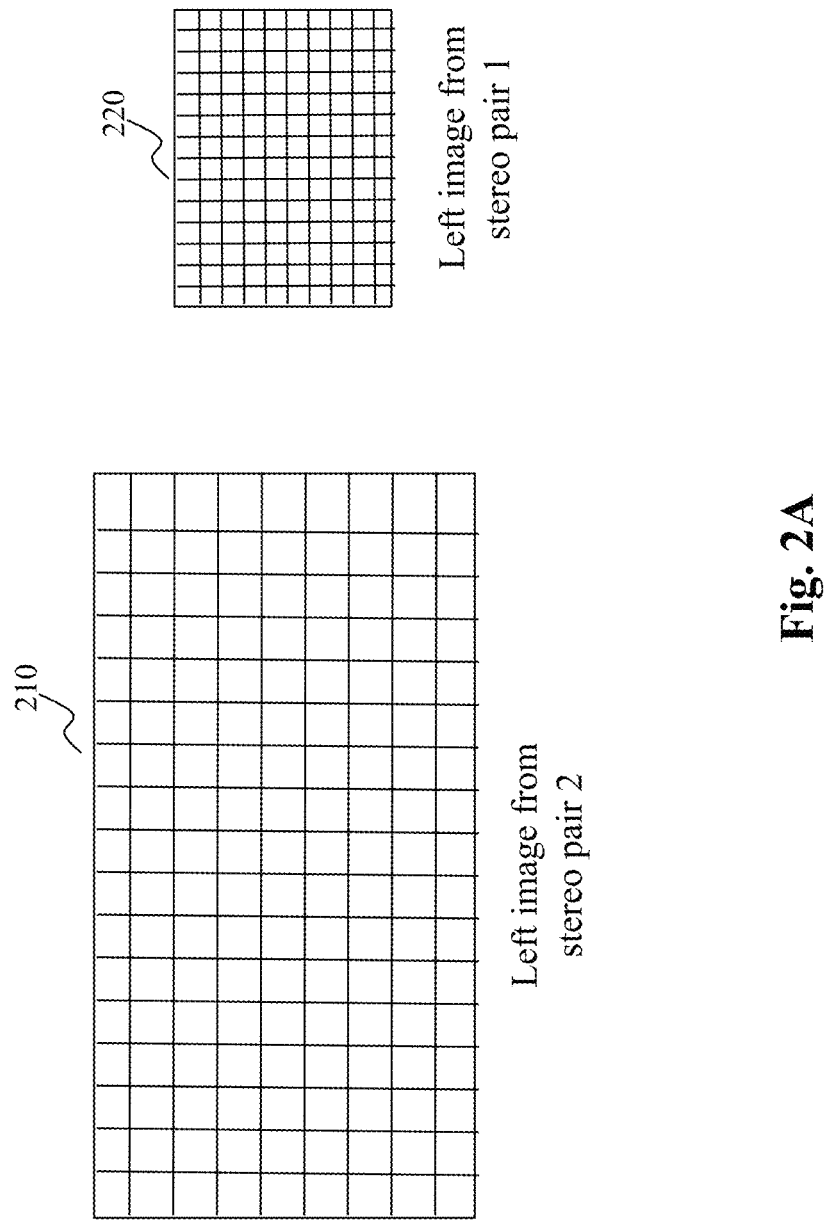
FIG. 2A shows a first image acquired by a stereo camera with a wide field of view and an image acquired by a stereo camera with a narrow field of view, according to an embodiment of the present teaching.
Figure 2B:
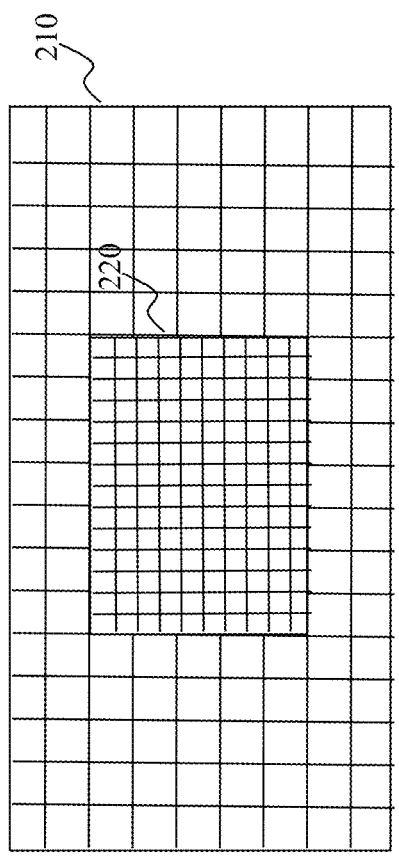
FIG. 2B shows a fused image based on an image with a coarser resolution acquired by a camera with a wide field of view and an image acquired by a camera with a narrow field of view, according to an embodiment of the present teaching.
Figure 2C:
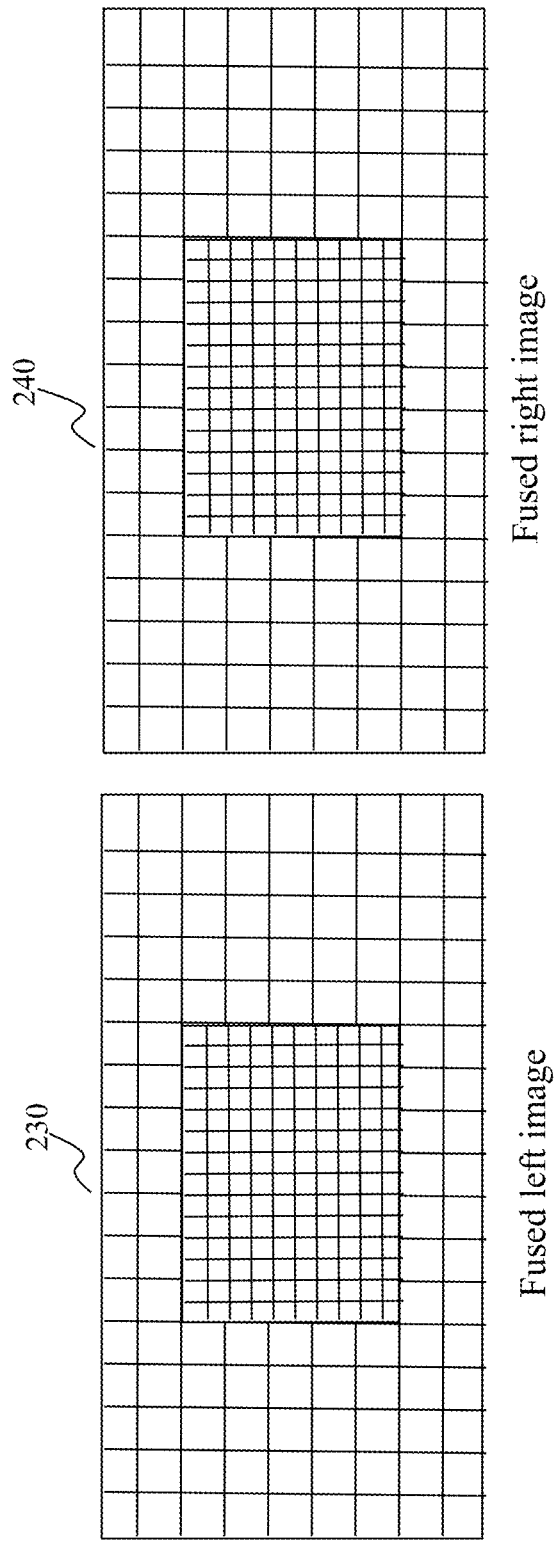
FIG. 2C shows fused stereo images generated based on wide and narrow fields of views of two pairs of stereo cameras, according to an embodiment of the present teaching.

FIG. 2A shows two images acquired by two left stereo cameras, according to an embodiment of the present teaching. As shown, an exemplary image 210 is acquired by a left stereo camera of the second stereo pair that has a wider field of view as well as an exemplary image 220 is acquired by a left stereo camera of the first stereo pair that has a narrow field of view. FIG. 2B shows a combined image generated by fusing the image 210 with a coarser resolution with a wide field of view and the image 220 with a finer resolution with a narrow field of view, according to an embodiment of the present teaching. When fused, each of the two fused images provides a multi-resolution fused image. As illustrated in FIG. 2B, image 220 is superimposed on image 210 at an appropriate position to generate a fused image 230 with certain region in a higher resolution. FIG. 2C shows fused left and right stereo images based on both wider and narrow fields of views from two pairs of stereo cameras, according to an embodiment of the present teaching. Left images from the two stereo pairs may be acquired and then fused together as shown in 230. Right images from the two stereo pairs may also be used for fusion to generate fused image 240. When fused in this manner, each of the two fused images provides a multi-resolution fused image and may then be used to estimate disparity in a more accurate manner for both shorter and longer ranges. Based on such determined disparity, the depth may then be estimated in a more accurate manner in terms of both shorter and longer ranges.

Figure 3:
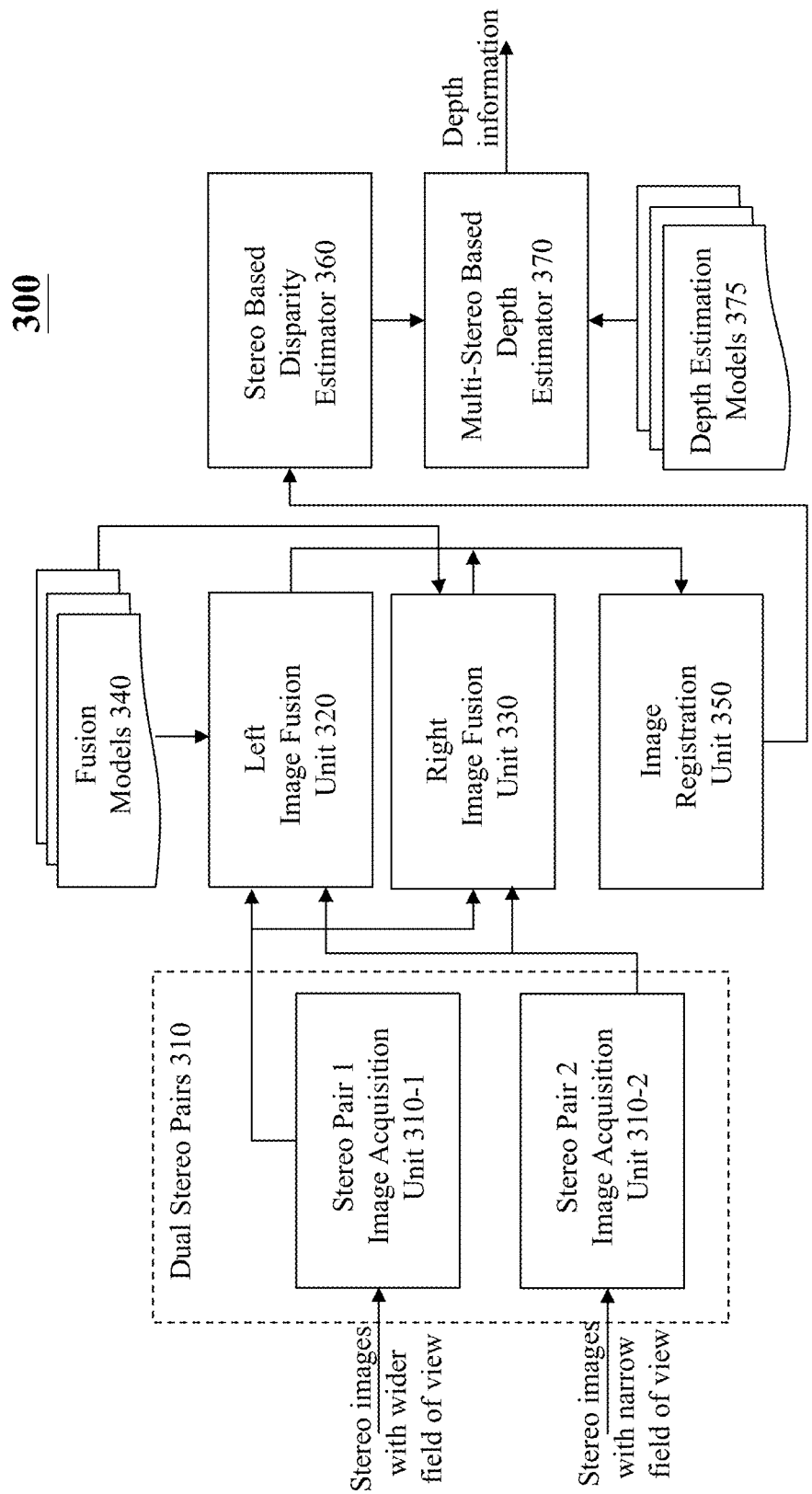
FIG. 3 depicts an exemplary high-level system diagram of a multiple stereo based depth estimation mechanism, according to an embodiment of the present teaching.
Figure 4:
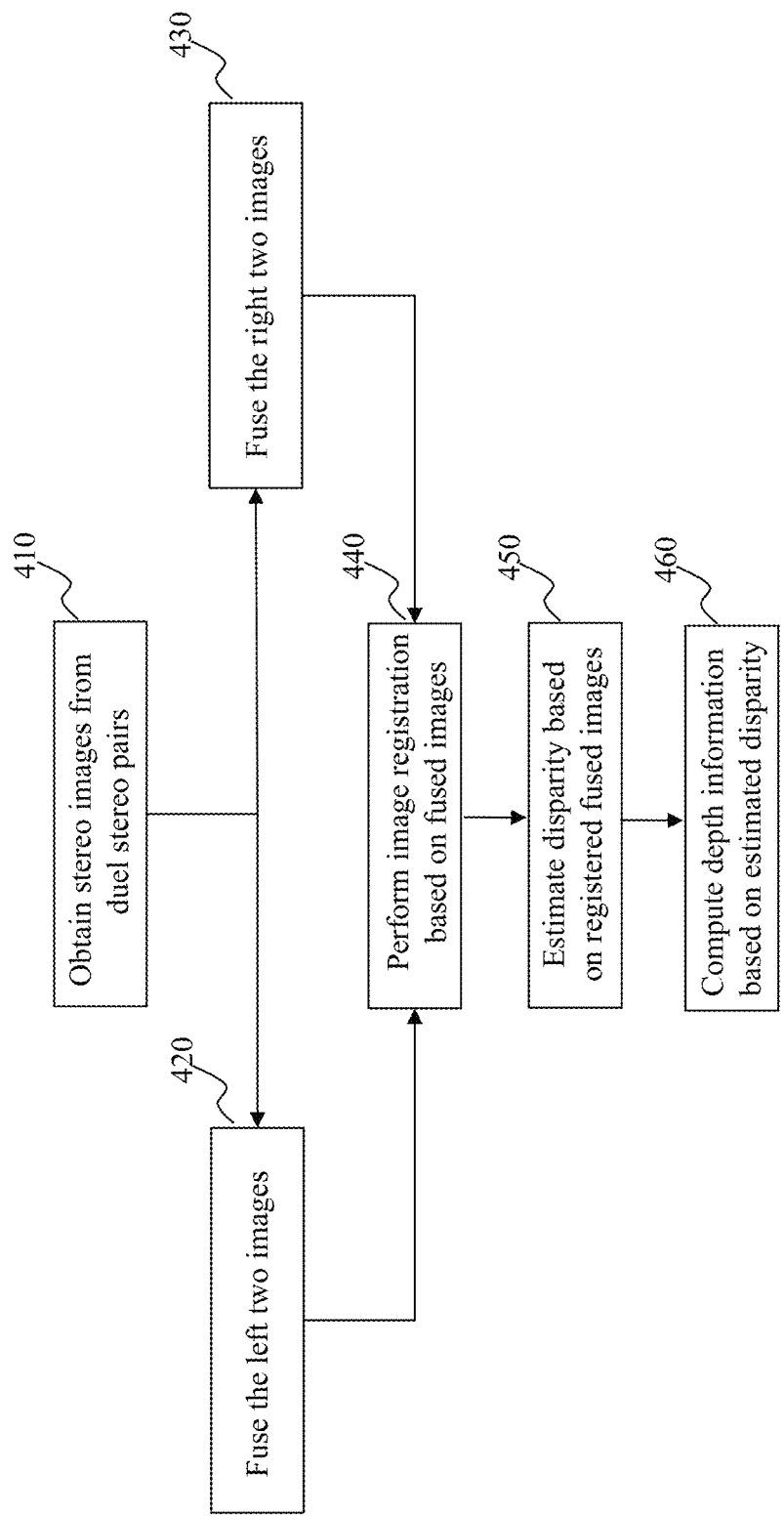
FIG. 4 is a flowchart of an exemplary process of a multiple stereo based depth estimation mechanism, according to an embodiment of the present teaching.

FIG. 3 depicts an exemplary high-level system diagram of a multiple stereo based depth estimation mechanism 300, according to an embodiment of the present teaching. In this illustrated embodiment, the multiple stereo based depth estimation mechanism 300 comprises a dual stereo pairs 310 including stereo pair 1 310-1 with a wider field of view and stereo pair 2 310-2 with a narrow field of view, a left image fusion unit 320, a right image fusion unit 330, an image registration unit 350, a stereo based disparity estimator 360, and a multi-stereo based depth estimator 370. FIG. 4 is a flowchart of an exemplary process of the multiple stereo based depth estimation mechanism 300, according to an embodiment of the present teaching. To perform depth estimation, two pairs of stereo images, one with a wider field of view and the other with a narrow field of view, are obtained, at 410, via the stereo pair 1 image acquisition unit 310-1 and the second pair 2 image acquisition unit 310-2, respectively. Each pair of such obtained stereo images includes a left image and a right image. To leverage the multiple stereo information, the left image fusion unit 320 fuses, at 420, the two left images from cameras of different stereo pairs (with wider and narrow fields of view) to generate the fused left image 230 (see FIG. 2C). Similarly, the right image fusion unit 330 fuses, at 430, the two right images from cameras of different pairs (with wider and narrow fields of view) to generate a fused right image 240 (see FIG. 2C). In some embodiments, the left and right image fusion units 320 and 330 carry out the fusion based on, e.g., some fusion models 340.

Based on the two fused left and right images, the image registration unit 350 performs, at 440, image registration of the fused left and right images. In some embodiments, the registration may be conducted based on the regions of the fused left and right images based on the higher resolution in the area to achieve improved registration. Based on such improved registration result, the stereo based disparity estimator 360 estimates, at 450, the disparity between the left and right images, which can then be used by the multi-stereo based depth estimator 370 to perform, at 460, depth estimation based on, e.g., some depth estimation models 375.

Figure 5B:
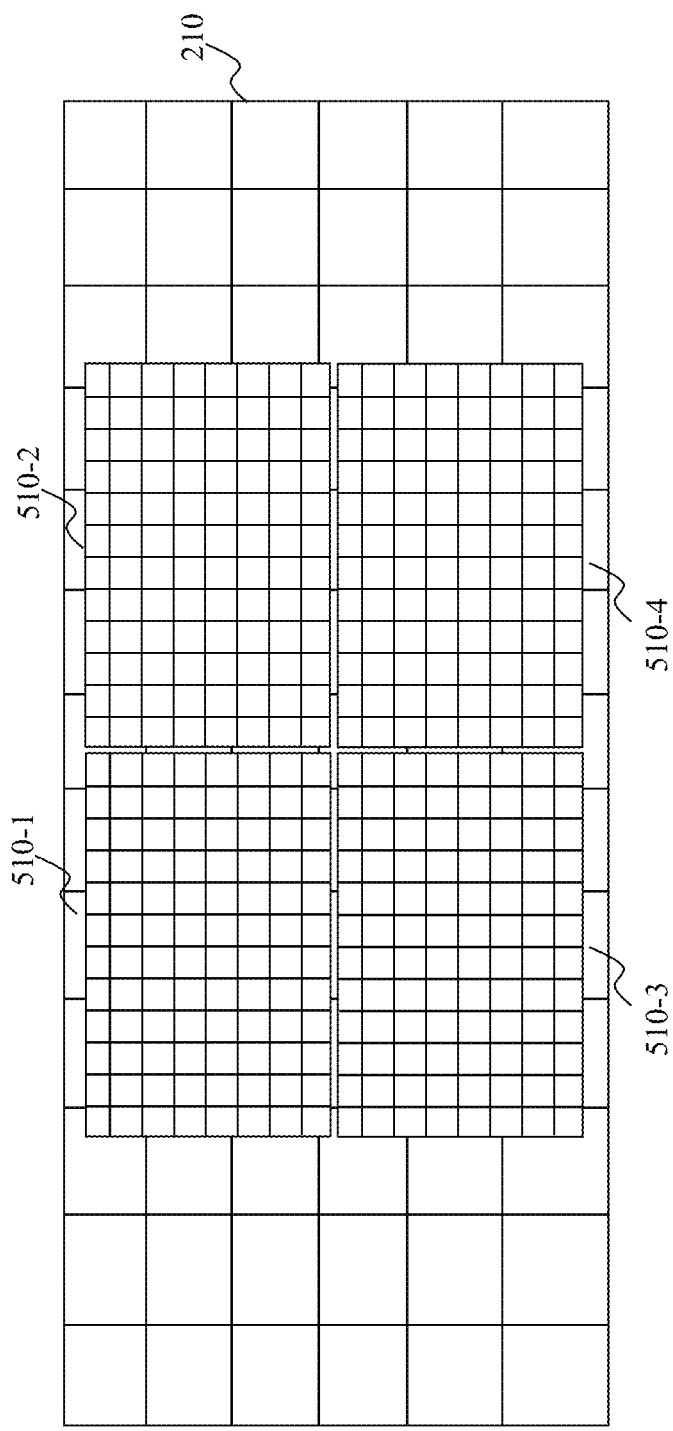

In FIGS. 1A-4, the dual stereo based depth estimation is discussed. In some embodiments, additional pair(s) of stereo cameras with narrow field of view may be used to provide an improved coverage of different regions of an image with a wider field of view. This is illustrated in FIG. 5A-5B, according to a different embodiment of the present teaching. In FIG. 5A, the image 210 with a wider field of view may be fused with a plurality of images with a narrow field of view 510, each may be calibrated to cover a certain area with the image 210 so that different regions in the image 210 may be fused with an image of narrow field of view. This is illustrated in FIG. 5B, where there are four pairs of stereo cameras with narrow field of view and each may be deployed to provide an image of narrow field of view with respect to a designated region of the image 210. In this manner, the four pairs enable improved fused resolution in more regions of the image 210.

Figure 6:
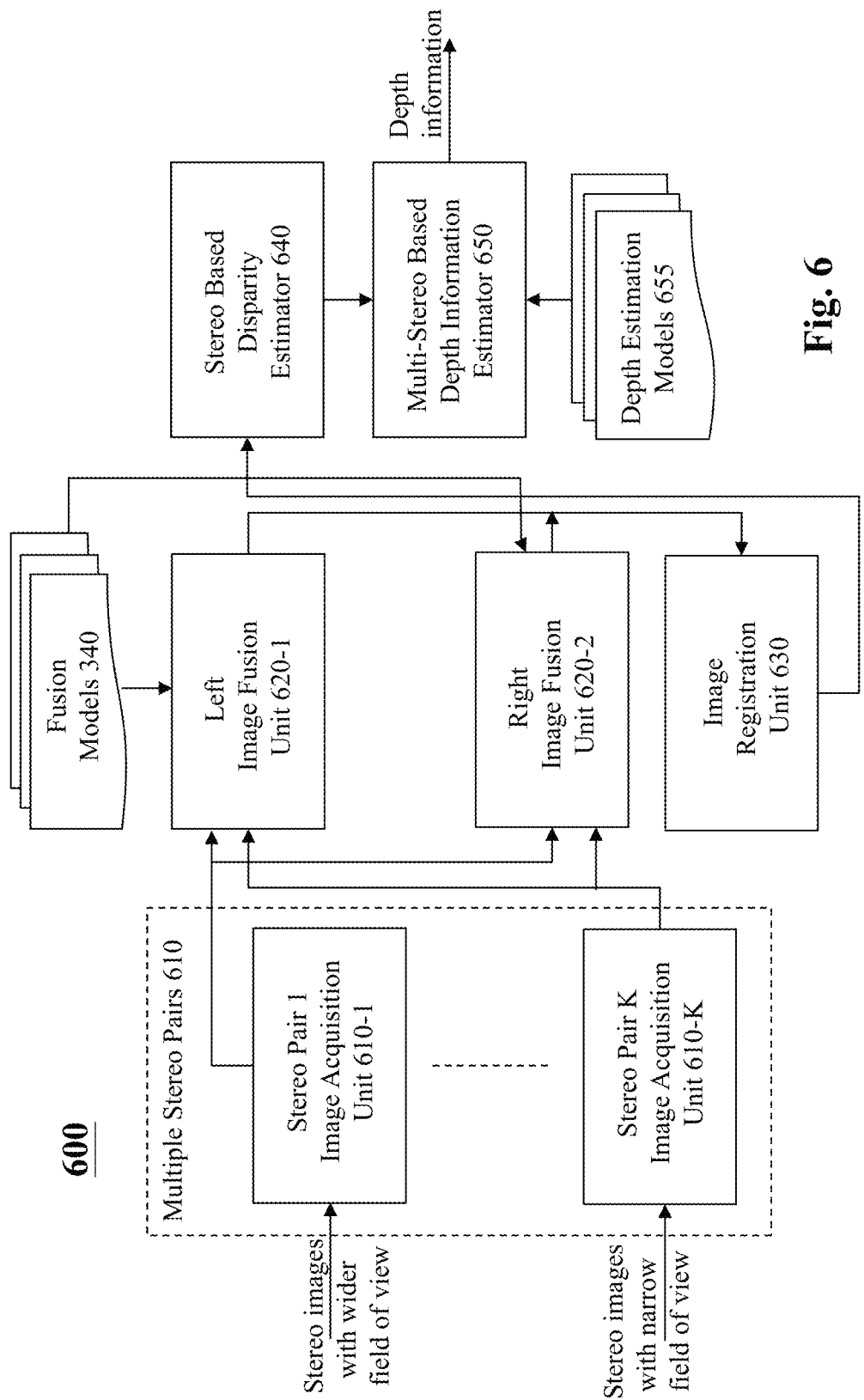
FIG. 6 depicts an exemplary high-level system diagram of a multiple stereo based depth estimation mechanism, according to a different embodiment of the present teaching.

FIG. 6 depicts an exemplary high-level system diagram of the multiple stereo based depth estimation mechanism 600 shown in FIG. 5B, according to a different embodiment of the present teaching. In this embodiment, the mechanism 600 is similarly constructed as mechanism 300 except that there are K stereo pairs in a multiple stereo pairs 610. Because in this mechanism 600, there are more than one stereo pairs directed to narrow field of view, a left and right image fusion units 620-1 and 620-2 (for fusing multiple images of narrow field of view with each of the left and right images from the stereo pair with wider field of view) operate to generate fused left and right images based on more than one pairs of images that correspond to images of narrow field of views. For example, the left image fusion unit 620-1 in mechanism 600 is to take multiple left images from different stereo pairs and align them with respect to different sub-regions in a left image from a stereo pair with a wider field of view to generate a fused left image. Similarly, the right image fusion unit 620-2 in mechanism 600 is to take multiple right images from different stereo pairs and align them with respect to different sub-regions in a right image from a stereo pair with a wider field of view to generate a fused right image.

Figure 7:
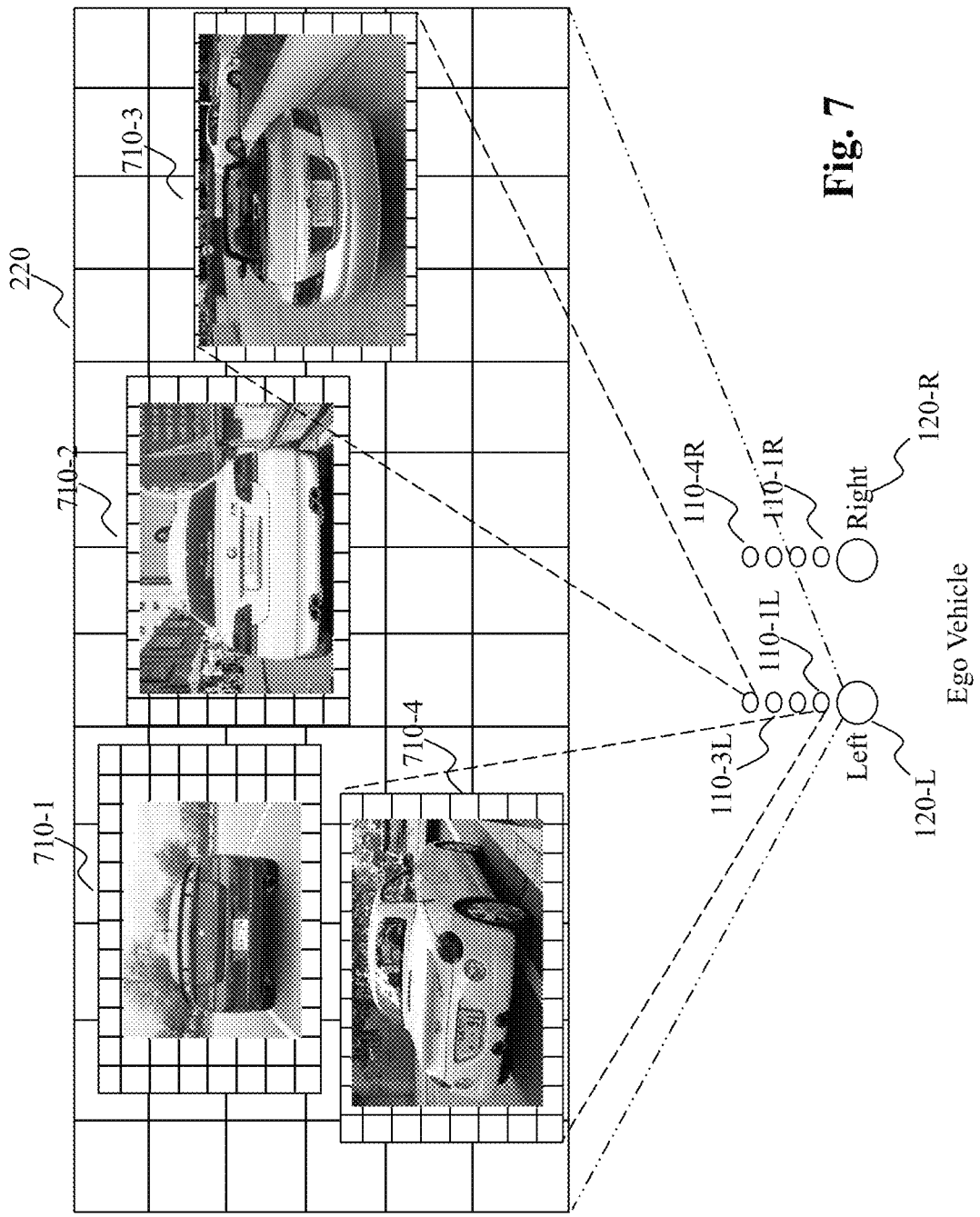
FIG. 7 illustrates object based multiple stereo based depth estimation, according to another different embodiment of the present teaching.

The number of stereo pairs of a narrow field of view to be used may depend on application needs. In some embodiments, the multiple stereo pairs 610 may provide a certain number of stereo pairs for images of narrow field of view and deployment of some of them may be controlled based on the application needs. For example, if there are 6 pairs designated for acquiring images of narrow field of view but in operation, only a subset of the 6 pairs may be activated and used for enhancing the depth estimation. One example of adaptively determining how many stereo pairs are to be used is shown in FIG. 7, which illustrates object based multiple stereo based depth estimation, according to another embodiment of the present teaching. That is, which stereo pairs with a narrow field of view are to be used for fusing with the image with a wider field of view is determined based on the number of relevant objects detected in the scene.

As exemplified in FIG. 7, in front of an ego vehicle, there are a number of objects of interest, e.g., four surrounding vehicles, some being in the front and some being on the side of the ego vehicle. To avoid collision with any of the detected nearby objects, it is important to accurately estimate the distance between the ego vehicle and the nearby detected objects. To improve the quality of the depth estimation with respect to each of the detected nearby objects, a stereo pair for acquiring an image with a narrow field of view in each of the regions corresponding to a nearby object may be identified and activated to acquire an image with a higher resolution.

On the ego vehicle, there are a plurality of stereo pairs of cameras, e.g., a stereo pair with a wider field of view and multiple (4 illustrated) stereo pairs of cameras with a narrow field of view. For example, there is a stereo pair 120 of cameras (120-L and 120-R) for capturing left and right images of a wider field of view and four more stereo pairs, i.e., 110-1, 110-2 (not labeled), 110-3, and 110-4, each with two cameras for capturing left and right images with a narrow field of view and being designated to cover a specific region of the image 220. It is illustrated that the left camera 120-L of the pair 120 with wider field of view acquires a left image 220 of the entire scene with a coarser resolution. For each of the detected nearby vehicles, a specific stereo pair covering the region with the vehicle detected is used to acquire left and right images in a higher resolution. For example, left camera 110-1L of stereo pair 110 acquires a left image 710-4 of the vehicle on the left of the ego vehicle and left camera 110-4L of a different stereo pair 110-3 acquires a left image 710-3 of a vehicle detected on the right of the ego vehicle. Similarly, left cameras 110-2L and 110-3L of stereo pairs 110-2 and 110-4 may acquire left images of different nearby vehicles detected in the scene, e.g., a vehicle in image region 710-a and a vehicle detected in image region 710-2. Then the right cameras of different stereo pairs may also be activated to acquire right images in their respective designated regions. In this manner, in this illustrated example, 5 pairs of stereo images are acquired, i.e., one corresponding to the pair of left and right images with a wider field of view and four pairs each corresponding to a pair of left and right images with a narrow field of view and covering a specific region where a nearby vehicle is detected.

In some embodiments, the region each of the pairs covers may be pre-determined. In this situation, if a nearby object detected encompasses two regions covered by different pairs, the stereo pairs covering such two regions may be both activated. In some embodiments, the region a stereo pair is to cover may be dynamically adjusted based on the object detection result. For example, depending on where in image 220 a nearby vehicle or an object is detected, an appropriate stereo pair may be selected, e.g., a pair that by default covers a region close to the region of the object, and the left and right cameras of the selected pair may be adjusted to refine their coverage region to cover the region where the object is detected. For example, such an adaptive adjustment may be realized by changing, e.g., the tilt, horizontal, and yawn position of the cameras to ensure its coverage of a specific region in the scene.

Figure 8:
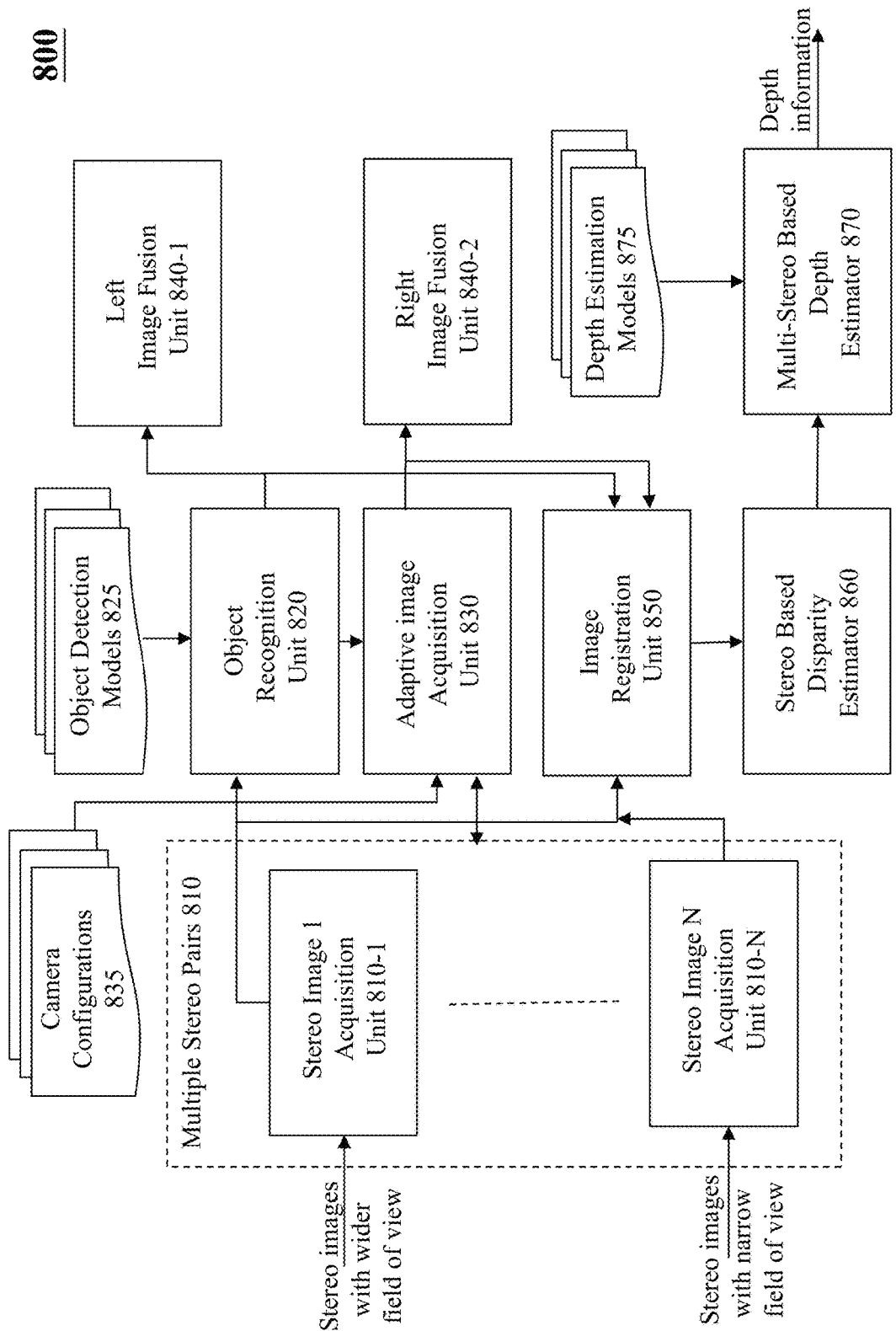
FIG. 8 depicts an exemplary high-level system diagram of an object based multiple stereo based depth estimation, according to another embodiment of the present teaching.

FIG. 8 depicts an exemplary high-level system diagram of an object based multiple stereo based depth estimation mechanism 800, according to another embodiment of the present teaching. The mechanism 800 is directed to adaptive utilization of multiple stereo pairs for depth estimation, as discussed herein. As shown, the mechanism 800 includes a plurality of N (N>2) stereo pairs, e.g., 810-1, . . . , 810-N, one directed to acquiring stereo images with a wider field of view and rest directed to acquiring stereo images with a narrow field of view. For the multiple stereo pairs directed to a narrow field of view, each of the pairs may be associated with a default coverage area in the scene.

To achieve adaptive usage of available stereo pairs based on need, the mechanism 800 also comprises an object recognition unit 820, an adaptive image acquisition unit 830, left and right image fusion units 840-1 and 840-2, an image registration unit 850, a stereo based disparity estimator 860, and a multi-stereo based depth estimator 870. The object recognition unit 820 is provided to detect relevant objects in a scene (e.g., nearby vehicles or other objects) based on object detection models 825. The detection may be performed based on an image acquired via a camera with a wider field of view so that it can provide not only the entire scene but also efficiency in the detection due to its lower resolution. Based on detected relevant objects in the scene, the adaptive image acquisition unit 830 is provided to determine which stereo pairs with a narrow field of view are to be used to provide higher resolution images in regions where relevant objects are detected. To achieve that, the adaptive image acquisition unit 830 may access camera configurations 835 to make a determination. Such configurations may indicate the region covered by each stereo pair and/or parameters that can be controlled with respect to each camera to adjust their coverages in the target region of a scene.

The adaptive image acquisition unit 830 may select stereo pairs with a narrow field of view based on a number of parameters, e.g., the number of relevant objects detected, the sizes of such detected relevant objects, and the default coverage of each of the stereo pair, etc. For example, the number of relevant objects detected may or may not be equal to the number of stereo pairs with a narrow field of view. Estimated sizes of the objects may also play a role in selection. For instance, an object may be small and partially occluded by a bigger object so that in this case, there is no need to allocate a stereo pair for the smaller object. In addition, it may not be necessary to have a stereo pair to cover every object. In some situations, some additional information may indicate that a detected object may not warrant (e.g., shape like a car but with a very small size or is becoming smaller and smaller over time) to have enhanced depth estimation so that the adaptive image acquisition unit 830 may ignore such object. In some situations, if adjusting the camera parameters is not adequate to cover a specific region, the adaptive image acquisition unit 830 may select two stereo pairs to cover the region. Once the stereo pairs are selected, the remaining operation of the mechanism 800 is similar to what is discussed with respect to FIG. 6.

Figure 9:
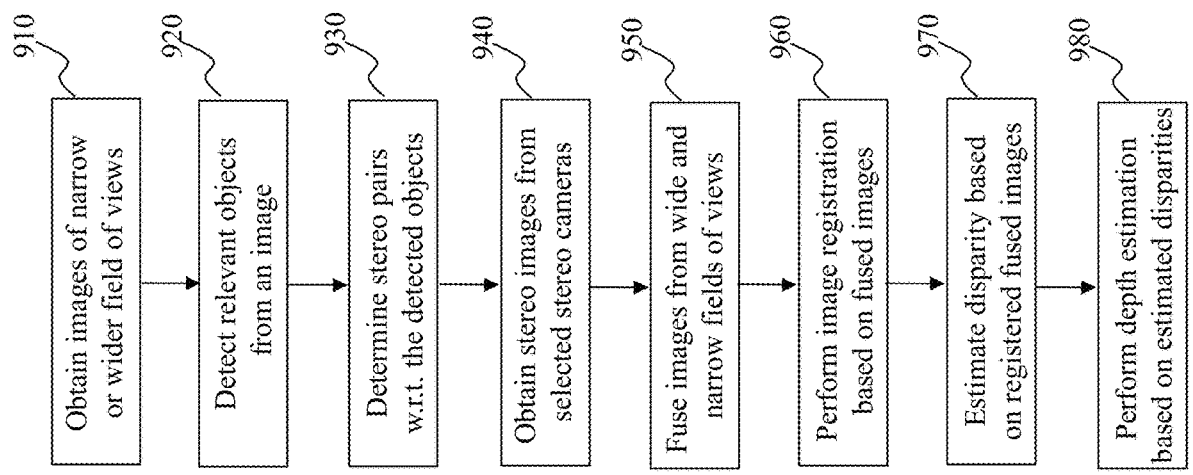
FIG. 9 is a flowchart of an exemplary process of an object based multiple stereo based depth estimation, according to another embodiment of the present teaching.

FIG. 9 is a flowchart of an exemplary process of the object based multiple stereo based depth estimation mechanism 800, according to another embodiment of the present teaching. The multiple stereo pairs 810 installed on an ego vehicle obtain, at 910, stereo images of both wider and narrow field of views. The object recognition unit 820 detects, at 920, relevant objects in some selected images acquired. As discussed herein, in some embodiments, the object detection may be performed in an image acquired by a camera with a wider field of view because, e.g., it captures the entire scene. Due to lower resolution images (left and right), detecting objects from such images may also make the processing more efficient.

Based on the detected relevant objects, the adaptive image acquisition unit 830 may determine, at 930, images from which stereo pairs of a narrow field of view are to be used for the subsequent processing. As discussed herein, the determination may be based on the current camera configurations 835, the number of relevant objects detected, characteristics of the detected objects (such as size, occlusion, etc.), . . . , and a history associated with each object (e.g., a same object used to be bigger and now is becoming smaller and smaller), etc. Such an adaptive decision yields a selection of stereo pairs from which images are to be obtained for depth estimation.

At 940, stereo images from selected stereo pairs are obtained by the left and right image fusion unit 840-1 and 840-2, respectively and used to fuse, at 950, the stereo images from the stereo pair of a wider field of view with the stereo images from the selected stereo pairs of a narrow field view. Such fusions generate two images, one is a fused left image and the other a fused right image. The fused left and right images are then used by the image registration unit 850 to perform, at 960, image registration. The registered (fused) left and right images are then used by the stereo based disparity estimator 860 to estimate, at 970, the disparity, which is then used by the multi-stereo based depth estimator 870 to compute, at 980, depth information of the scene (or relevant objects). The depth information estimated based on the approached discussed herein may then be used to devise avoidance strategies, which includes to compute parameters accordingly that are used to control the vehicle to avoid collision or generate warnings to a driver.

Figure 10:
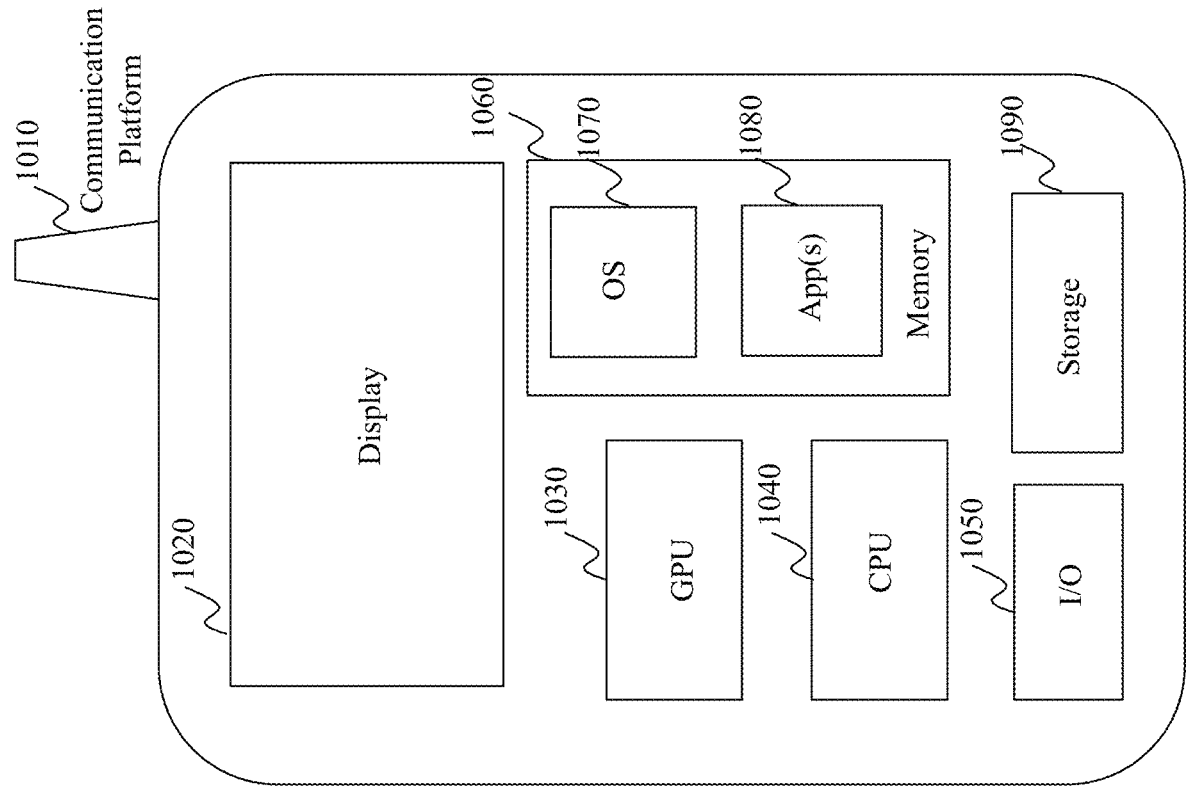
FIG. 10 depicts the architecture of a mobile device which can be used to implement a specialized system incorporating the present teaching.

FIG. 10 depicts the architecture of a mobile device which can be used to realize a specialized system implementing the present teaching. This mobile device 1000 includes, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1000 in this example includes one or more central processing units (CPUs) 1040, one or more graphic processing units (GPUs) 1030, a display 1020, a memory 1060, a communication platform 1010, such as a wireless communication module, storage 1090, and one or more input/output (I/O) devices 1050. Any other suitable component, including but not limited to a system bus or a controller (not shown), may also be included in the mobile device 1000. As shown in FIG. 10, a mobile operating system 1070, e.g., iOS, Android, Windows Phone, etc., and one or more applications 1080 may be loaded into the memory 1060 from the storage 1090 in order to be executed by the CPU 1040.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the present teachings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

FIG. 11 depicts the architecture of a computing device which can be used to realize a specialized system implementing the present teaching. Such a specialized system incorporating the present teaching has a functional block diagram illustration of a hardware platform which includes user interface elements. The computer may be a general-purpose computer or a special purpose computer. Either or both can be used to implement the present teaching. This computer 1100 may be used to implement any component of the present teachings, as disclosed herein. Although only one such computer is shown, for convenience, the computer functions relating to the present teachings as described herein may be implemented in a distributed fashion on a number of similar platforms, to distribute the processing load.

The computer 1100, for example, includes COM ports 1150 connected to and from a network connected thereto to facilitate data communications. The computer 1100 also includes a central processing unit (CPU) 1120, in the form of one or more processors, for executing program instructions. The exemplary computer platform includes an internal communication bus 1110, program storage and data storage of different forms, e.g., disk 1170, read only memory (ROM) 1130, or random-access memory (RAM) 1140, for various data files to be processed and/or communicated by the computer, as well as possibly program instructions to be executed by the CPU. The computer 1100 also includes an I/O component 1160, supporting input/output flows between the computer and other components therein such as user interface element. The computer 1100 may also receive programming and data via network communications.

Hence, aspects of the methods of the present teachings, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other enhanced ad server into the hardware platform(s) of a computing environment or other system implementing a computing environment or similar functionalities in connection with the present teachings. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the present teachings as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computer having at least one processor, a storage, and a communication platform for determining depth information in autonomous driving, comprising:
obtaining stereo images from multiple stereo pairs selected from at least two stereo pairs, wherein the at least two stereo pairs have stereo cameras installed with a same baseline and in a same vertical plane, wherein one of the at least two stereo pairs is configured to acquire stereo images of a scene with a wider field of view and remaining of the at least two stereo pairs is configured to acquire stereo images of the scene with a narrow field of view, wherein the obtaining further comprises:
receiving at least one image from the stereo pair capturing the scene with the wider field of view,
detecting one or more relevant objects from the at least one image, and
selecting the multiple stereo pairs from the at least two stereo pairs based on the one or more relevant objects, wherein each of the multiple stereo pairs with a narrow field of view is configured to capture a region in the at least one image where the object is observed;
fusing left images from the multiple stereo pairs to generate a fused left image;
fusing right images from the multiple stereo pairs to generate a fused right image;
estimating disparity based on the fused left and right images; and
computing depth information of a scene captured by the stereo images based on the stereo images and the disparity.

2. The method of claim 1, wherein the stereo images acquired by the stereo pair with a wider field of view capture the scene and in a coarser resolution.

3. The method of claim 1, wherein each of the remaining of the at least two stereo pairs is configured to acquire stereo images in a higher resolution, each of the stereo images with a narrow field of view capturing a part of the scene.

4. The method of claim 1, further comprising at least one of:
determining an avoidance strategy based on the depth information; and
generating a collision warning signal in accordance with the avoidance strategy.

5. A machine readable and non-transitory medium having information recorded thereon for determining depth information in autonomous driving, wherein the information, when read by the machine, causes the machine to perform:
obtaining stereo images from multiple stereo pairs selected from at least two stereo pairs, wherein the at least two stereo pairs have stereo cameras installed with a same baseline and in a same vertical plane, wherein one of the at least two stereo pairs is configured to acquire stereo images of a scene with a wider field of view and remaining of the at least two stereo pairs is configured to acquire stereo images of the scene with a narrow field of view, wherein the obtaining further comprises:
receiving at least one image from the stereo pair capturing the scene with the wider field of view,
detecting one or more relevant objects from the at least one image, and
selecting the multiple stereo pairs from the at least two stereo pairs based on the one or more relevant objects, wherein each of the multiple stereo pairs with a narrow field of view is configured to capture a region in the at least one image where the object is observed;
fusing left images from the multiple stereo pairs to generate a fused left image;
fusing right images from the multiple stereo pairs to generate a fused right image;
estimating disparity based on the fused left and right images; and
computing depth information of a scene captured by the stereo images based on the stereo images and the disparity.

6. The medium of claim 5, wherein the stereo images acquired by the stereo pair with a wider field of view capture the scene and in a coarser resolution.

7. The medium of claim 5, wherein each of the remaining of the at least two stereo pairs is configured to acquire stereo images in a higher resolution, each of the stereo images with a narrow field of view capturing a part of the scene.

8. The medium of claim 5, wherein, the information, when read by the machine, further causes the machine to perform:
determining an avoidance strategy based on the depth information; and
generating a collision warning signal in accordance with the avoidance strategy.

9. A system for determining depth information in autonomous driving, comprising:
multiple stereo pairs configured for obtaining stereo images, wherein the multiple stereo pairs are selected from at least two stereo pairs, which have stereo cameras installed with a same baseline and in a same vertical plane, wherein one of the at least two stereo pairs is configured to acquire stereo images of a scene with a wider field of view and remaining of the at least two stereo pairs is configured to acquire stereo images of the scene with a narrow field of view:
an object recognition unit configured for:
receiving at least one image from the stereo pair capturing the scene with the wider field of view,
detecting one or more relevant objects from the at least one image, and
selecting the multiple stereo pairs from the at least two stereo pairs based on the one or more relevant objects, wherein each of the multiple stereo pairs with a narrow field of view is configured to capture a region in the at least one image where the object is observed;
a left image fusion unit configured for fusing left images from the multiple stereo pairs to generate a fused left image;
a right image fusion unit configured for fusing right images from the multiple stereo pairs to generate a fused right image;
a stereo based disparity estimator configured estimating disparity based on the fused left and right images; and
a multi-stereo based depth estimator configured for computing depth information of a scene captured by the stereo images based on the stereo images and the disparity.

10. The system of claim 9, wherein the stereo images acquired by the stereo pair with a wider field of view capture the scene and in a coarser resolution.

11. The system of claim 9, wherein each of the remaining of the at least two stereo pairs is configured to acquire stereo images in a higher resolution, each of the stereo images with a narrow field of view capturing a part of the scene.

12. The system of claim 9, further comprising an adaptive image acquisition unit configured for determining the multiple stereo pairs for receiving left and right stereo images from each of the multiple stereo pairs.

13. The system of claim 9, wherein the depth information determined based on the stereo images from the at least some stereo pairs is used for at least one of:
   determining an avoidance strategy based on the depth information; and
   generating a collision warning signal in accordance with the avoidance strategy.

* * * * *